July 9, 1957  R. L. EVANS  2,798,932
SOLDER POT
Filed Sept. 7, 1954
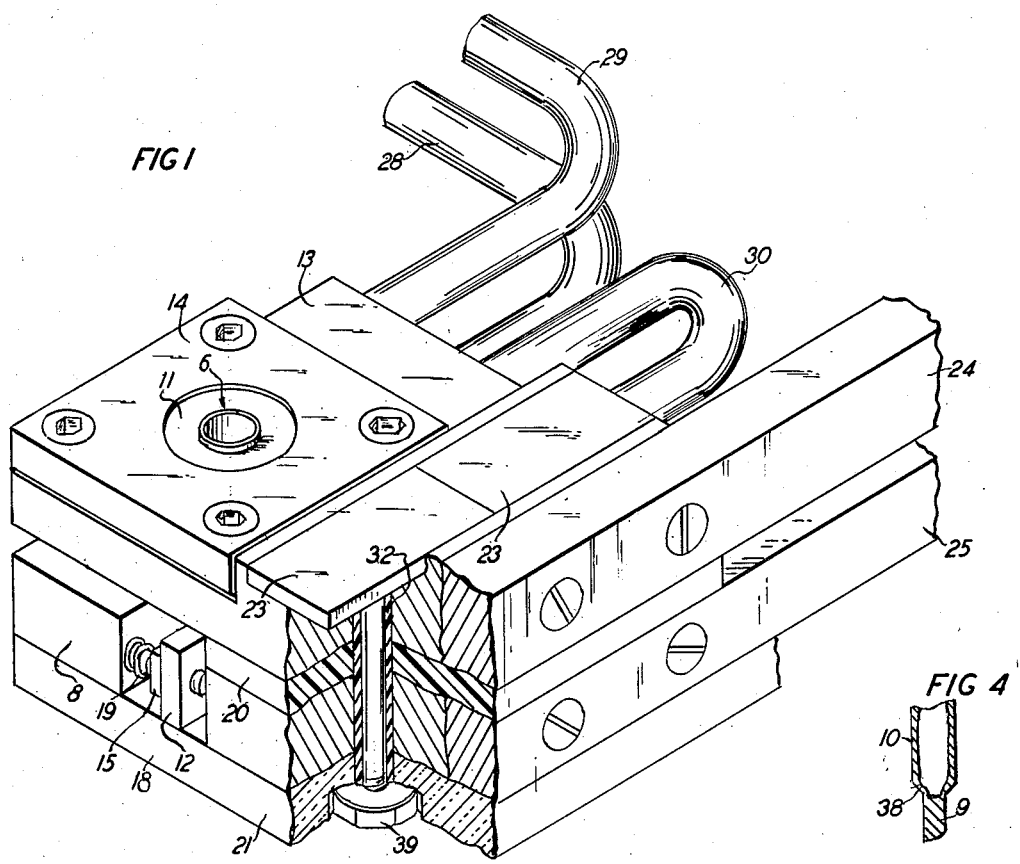
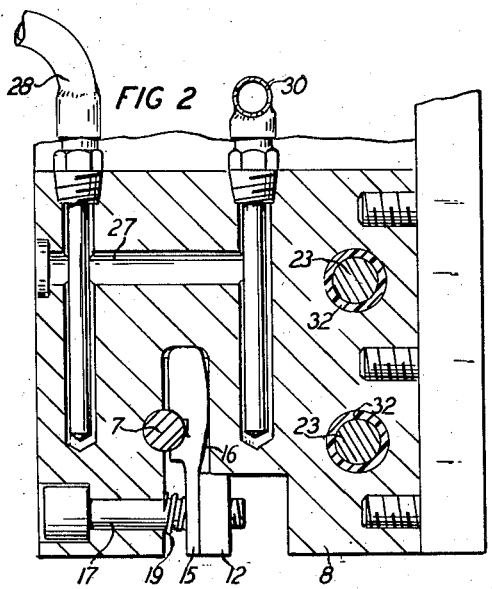
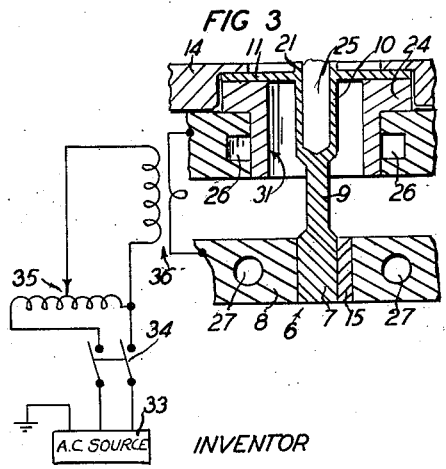
INVENTOR
R. L. EVANS
BY
ATTORNEY 2,798,932
Patented July 9, 1957

2,798,932
SOLDER POT

Robert L. Evans, Indianapolis, Ind., assignor to Western Electric Company, Incorporated, New York, N. Y., a corporation of New York Application September 7, 1954, Serial No. 454,321

2 Claims. (Cl. 219—44)

This invention relates to an improved high temperature resistance heating device and particularly to such a device for melting solder.

In the manufacture of telephone apparatus such as transmitter coils, the soldering of the small diameter enamel insulated wires thereof has been facilitated by dipping the leads into a pot or crucible containing molten silver solder heated to about 1500° F. A first dip of the leads in the solder at this high temperature removes the insulation. Then by successively dipping the leads into a flux such as borax and then into the melted solder, a good soldered connection may be obtained. The flux for convenience may form a melted layer on top of the solder. Most of the commercially available silver solder pots are heated by conduction, have brittle or fragile heating elements and require long heating-up periods of about 3 to 4 hours.

It is, therefore, an object of this invention to provide an improved, sturdy solder pot which will heat up very quickly.

According to the general features of the invention, the improved solder pot or crucible is resistance heated directly by the passage of a high current through the crucible itself, water cooling being employed to carry off the heat accumulation adjacent the crucible.

According to a feature of the invention, a disc portion surrounding the opening of the crucible serves both as a conductive connection therefor and also for keeping the flux and extraneous material from reaching the hotter parts of the crucible which may be damaged thereby.

According to another feature, the crucible is so proportioned that the hottest part thereof is at the base of the solder well so that the chemical activity of the solder therein will be greatest at the bottom and less at the side walls therefore increasing the life of the crucible.

According to still another feature, an elevated annular ridge is provided around the well opening to raise the melted solder level to facilitate dipping objects therein.

These and other features of the invention will be more fully understood from the following detailed description taken in conjunction with the accompanying drawing, in which:

Fig. 1 is an isometric view, partially in section, of a solder pot according to the invention;

Fig. 2 is a view of the device of Fig. 1 through the lower electrode member, parallel to the base;

Fig. 3 is a vertical cross-sectional view of a part of the device of Fig. 1 showing the crucible and the associated electrical connections therefor, and Fig. 4 is a cross-sectional view of a part of a crucible showing the etching effect of the solder thereon.

Referring now to the drawing, the silver solder pot shown is comprised basically of a crucible 6, through which a large current is passed to melt solder therein, and water-cooled upper and lower electrodes 13 and 8 respectively for making electrical connection between the crucible and power bus bars 24 and 25.

The crucible 6 as seen in cross section in Fig. 3 is made preferably of chrome-steel or a stainless steel having low chemical activity with silver and zinc solder and borax flux. Structurally, the crucible has a lower portion 7 of relatively large cross-sectional area to which lower electrode 8 is clamped, an upper thin-walled portion 10 for solder well 25, a heat generating connecting portion 9 of a relatively small cross-sectional area, a concentric disc portion 11 to which upper electrode 13 is clamped and a raised annular ridge 12 around the opening of the well 25 for elevating the melted solder in the well above the disc portion.

Electrodes 13 and 8 have water cooling passages 26 and 27 respectively, cooling water being circulated therethrough by means of hoses 28 and 29 which are connected to a water supply not shown in the drawing. The passages of the two electrodes are joined into one circulatory path by means of an interconnecting hose 30. The cooling water enters the lower electrode passage 27 from hose 28, passes out through hose 30, enters the upper electrode passage 26 therefrom, passes around the aperture for the crucible and out through hose 29.

The upper electrode which is bolted to power supply bus bar 24 has a cylindrical insert 31 welded in an aperture therefor, the insert having a flanged end 24 for contacting the lower surface of the disc portion 11 of the crucible. This composite structure facilitates machining the cooling passage 26. A clamping or cap member 14 having a recess therein corresponding to the flanged end 24 of the insert and a coaxial aperture for the crucible is bolted to the electrode 13 and clamps the outer rim of the crucible disc 11 thereto. Besides serving as a conductive connection to the crucible, the disc also serves as a heat dissipater. The internal heating effect of current passing through the disc decreases directly with the distance from the crucible proper since the current density decreases as the cross-sectional area of the conductor increases. For this reason the outer diameter of the disc portion is made several times larger than that of the well portion 10.

The lower electrode 8 which is bolted to bus bar 25 is clamped to the lower portion 7 of the crucible by a clamping member 15 which pivots against surface 16 when bolt 17 is screwed into nut 12. A spring 19 on bolt 17 exerts a force which tends to separate the clamping member 15 from the crucible and is provided to facilitate removal of the crucible.

Electrodes 8 and 13 are mounted in spaced relation in an assembly by through T bolts 23 and are electrically separated by a phenol fiber insulator 20 and insulating sleeves 32 on the T bolts. The assembly is held together by nuts 39, fastened to the T bolts, in recesses in the bottom side of an insulating base plate 21.

A simple electrical diagram for the device shown in Fig. 3 utilizes a 115 volt, 60 cycle per second source 33 connected through a two-pole, toggle switch 34 and a variac 35 to a transformer 36 having a low voltage secondary winding.

In one instance, a solder pot constructed in accordance with the above teachings utilizes a 1 kva. variac 35, a 500 watt transformer 36 having a 1.15 volt secondary winding. With the variac adjusted for a voltage drop of one-half volt across a crucible of 446 stainless steel, operating temperature of 1500° F. is reached within approximately 90 seconds. In this case the main heat generating portion 9 of the crucible has a diameter of 0.188 inch and is seventeen thirty-seconds of an inch long while the solder well is one-quarter of an inch in diameter, has a depth of five-eighths of an inch from the top of the annular ridge 21 and has walls of about one thirty-second of an inch in thickness.

The principal heat for the pot is generated at the bottom of the well in the small cross-sectional area 9 due to the high current density therethrough. By concentrating the heat in this area most of the chemical activity of zinc and silver solder in the well will occur at the bottom and chemical etching, as seen in Fig. 4, numeral 38, will be concentrated there and not in the vicinity of the thin walls of the well. Etching then, tends to progress through the metal of the crucible into the small cross-sectional area and does not break through to the outside as quickly as if the heat concentration was close to the side walls of the crucible. This is of practical significance as it results in longer life for the crucible.

While this invention has been described with respect to a particular embodiment for purposes of illustration, it will be understood that the device could be modified in various ways in accordance with the general principles of the invention and the requirements of the particular conditions of use. For example, instead of using a stainless steel for the crucible, other metals having suitable resistivity and high melting points could be used. The proportioning of the crucible, of course, depends on the type of metal used, the desired operating temperature and the size of the solder well.

These and numerous other arrangements may be devised by those skilled in the art which will embody the principles of the invention and fall within the spirit and scope thereof.

What is claimed is:

1. An electrical resistance heated solder pot comprising a crucible member having an upper, cylindrical well portion for receiving solder to be melted, a lower, electrode contacting portion, an interconnecting cylindrical portion of small cross-sectional area between the two portions for generating heat when a current is passed therethrough, an annular disc extending transversely out from and concentric with the opening of the well in the upper portion, the outer diameter of the disc being several times greater than the diameter of the well portion, and a raised annular ridge on the disc for elevating the effective well height above the disc to facilitate dip soldering, and means for connecting the solder pot to a source of electrical energy including an electrode connected to said lower portion and a second electrode clamped around the outer rim of the disc.

2. A high temperature solder pot for melting silver solder comprising a crucible member made of a metal from the class including chrome and stainless steels and having an upper, cylindrical well portion, a lower, electrode contacting portion, an interconnecting portion of small cross-sectional area between the two portions for generating heat when a current is passed therethrough, an annular disc extending transversely out from and concentric with the opening of the well in the upper portion, the outer diameter of the disc being several times greater than the diameter of the well portion and a raised annular ridge on the disc for elevating the effective well height above the disc to facilitate dip soldering, and means for connecting the solder pot to a source of electrical energy including an electrode connected to said lower portion and a second electrode clamped around the outer rim of the disc.

References Cited in the file of this patent
UNITED STATES PATENTS

| | | |
|---|---|---|
| 1,430,858 | Speirs | Oct. 3, 1922 |
| 2,416,211 | Osterberg | Feb. 18, 1947 |
| 2,641,676 | Jeurling | June 9, 1953 |
| 2,665,229 | Schuler | Jan. 5, 1954 |